US008818665B2

(12) United States Patent
Kurata et al.

(10) Patent No.: US 8,818,665 B2
(45) Date of Patent: Aug. 26, 2014

(54) VEHICLE CONTROL APPARATUS

(75) Inventors: Takeshi Kurata, Wako (JP); Takahiro Eguchi, Wako (JP); Ayae Ikuro, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 363 days.

(21) Appl. No.: 13/381,635

(22) PCT Filed: Jul. 5, 2010

(86) PCT No.: PCT/JP2010/061402
§ 371 (c)(1),
(2), (4) Date: Dec. 29, 2011

(87) PCT Pub. No.: WO2011/010548
PCT Pub. Date: Jan. 27, 2011

(65) Prior Publication Data
US 2012/0108389 A1    May 3, 2012

(30) Foreign Application Priority Data
Jul. 22, 2009  (JP) ................. 2009-170840

(51) Int. Cl.
*G06F 7/00*    (2006.01)
(52) U.S. Cl.
USPC ............................................... 701/55
(58) Field of Classification Search
USPC .......... 477/37, 44, 34, 45, 3; 475/5, 184, 200, 475/201, 210, 220, 225, 343; 701/51, 55, 701/56, 58, 65
See application file for complete search history.

(56) References Cited

U.S. PATENT DOCUMENTS

| 6,076,032 A * | 6/2000 | Kuroda et al. ............... 701/54 |
| 6,671,601 B2 * | 12/2003 | Abiru ........................ 701/51 |
| 8,147,366 B2 * | 4/2012 | Kawasaki et al. ........... 475/5 |
| 2007/0082781 A1 * | 4/2007 | Eguchi et al. ............... 477/44 |

FOREIGN PATENT DOCUMENTS

| JP | 62-66235 | 4/1987 |
| JP | 10-151965 A | 6/1998 |
| JP | 11-325206 | 11/1999 |
| JP | 2000-289496 A | 10/2000 |
| JP | 2008-202435 | 9/2008 |

OTHER PUBLICATIONS

Japanese Decision to Grant a Patent Application No. JP2011-523599, dated Jul. 24, 2103 (with English Translation).

* cited by examiner

*Primary Examiner* — Saul Rodriguez
*Assistant Examiner* — David J Hlavka
(74) *Attorney, Agent, or Firm* — Arent Fox LLP (57) ABSTRACT

A vehicle control apparatus is configured to set a desired speed of an engine to be inputted to a CVT based on a vehicle speed and an accelerator opening AP, calculate a desired output of the engine based on the accelerator opening; calculate a correction coefficient based on the vehicle speed, and calculate a corrected desired output by correcting the desired output with the correction coefficient such that the vehicle speed reaches a regulatory vehicle speed when the accelerator opening AP reaches a fully-opened position, i.e., to vary the characteristics of the accelerator opening in accordance with the vehicle speed in the vicinity of the regulatory vehicle speed.

12 Claims, 5 Drawing Sheets

VEHICLE CONTROL APPARATUS

CROSS-REFERENCE TO RELATED APPLICATION

This Application is a National Stage entry of International Application No. PCT/JP2010/061402, having an international filing date of Jul. 5, 2010; which claims priority to Japanese Application No.: 2009-170840, filed Jul. 22, 2009, the disclosure of each of which is hereby incorporated in its entirety by reference.

TECHNICAL FIELD

This invention relates to a vehicle control apparatus, particularly to an apparatus for controlling a vehicle having a CVT (Continuous Variable Transmission) that changes an output of a prime mover of the vehicle in speed.

BACKGROUND ART

In the CVT, a desired speed is set in terms of an inputted speed of an internal combustion engine based on a vehicle speed and an accelerator opening (position). On the engine side, a desired output thereof is calculated based on the vehicle speed, accelerator opening and speed of the engine and the operation of a DBW mechanism is controlled to achieve the calculation result, as taught, for example, by a Patent Reference 1

PRIOR ART REFERENCE

Patent Reference

Patent Reference 1: Japanese Laid-Open Patent Application 2000-289496

SUMMARY OF INVENTION

Problems to be Solved by the Invention

Running speeds of vehicles are limited to 180 km/h under the self-regulation of automobile manufacturers (hereinafter this maximum speed is called the "regulatory vehicle speed"). Since the output of the engine (prime mover) is limited accordingly, the engine output is saturated with a certain throttle opening. Consequently, even when the accelerator opening reaches only a half of the fully-opened position (opening when an accelerator pedal is fully pressed down) or thereabout, the vehicle speed reaches the regulatory vehicle speed.

As a result, since the vehicle speed does not change even when the accelerator pedal is pressed down beyond the certain throttle opening, the operator can not have a good acceleration feel. Further, since the vehicle is driven under a small accelerator opening condition, a ratio of the CVT tends to be controlled to an OD (overdrive) side, disadvantageously. Such control to the OD side is not preferable for a belt type CVT in terms of durability because it increases load on the belt. Furthermore, upon exceeding the regulatory vehicle speed, since the fuel-cut is carried out, the input torque is abruptly decreased and it also deteriorates the drivability.

The object of this invention is therefore to overcome this problem by providing an apparatus for controlling a vehicle having a CVT that changes an output of a prime mover of the vehicle in speed, which apparatus varies the characteristics of an accelerator opening in accordance with a vehicle speed in vicinity of the regulatory vehicle speed.

Means for Solving the Problems

In order to achieve the object, as recited in claim 1, this invention is configured to have an apparatus for controlling a vehicle having a belt type CVT that changes output of a prime mover mounted on the vehicle in speed, comprising desired speed setting means for setting a desired speed of the prime mover to be inputted to the CVT based on a running speed of the vehicle and an accelerator opening; desired output calculating means for calculating a desired output of the prime mover based on the accelerator opening; correction coefficient calculating means for calculating a correction coefficient based on the running speed of the vehicle; and corrected desired output calculating means for calculating a corrected desired output by correcting the desired output with the correction coefficient such that the running speed of the vehicle reaches a regulatory vehicle speed when the accelerator opening reaches a fully-opened position.

In the apparatus according to claim 2, the correction coefficient calculating means calculates the correction coefficient such that it gradually decreases after the running speed reaches a prescribed speed before the regulatory vehicle speed.

In the apparatus according to claim 3, the correction coefficient calculating means calculates the correction coefficient such that it sharply decreases after the running speed exceeds the regulatory vehicle speed.

Effects of the Invention

In the vehicle control apparatus according to claim 1, it is configured to set a desired speed of the prime mover to be inputted to the CVT based on a running speed of the vehicle and an accelerator opening, calculate a desired output of the prime mover based on the accelerator opening, calculate a correction coefficient based on the running speed of the vehicle, and calculate a corrected desired output by correcting the desired output with the correction coefficient such that the running speed of the vehicle reaches a regulatory vehicle speed when the accelerator opening reaches a fully-opened position, i.e., to vary the characteristics of the accelerator opening in accordance with the vehicle speed in the vicinity of the regulatory vehicle speed. Therefore, it becomes possible to achieve the characteristics that enable the vehicle speed to reach the regulatory vehicle speed eventually when the accelerator pedal is fully pressed down, thereby giving a good acceleration feel to the operator.

Further, since the characteristics are configured to enable the vehicle speed to reach the regulatory vehicle speed eventually when the accelerator pedal is fully pressed down, the vehicle is driven with a relatively large accelerator opening. Consequently, a ratio of the CVT tends to be controlled at a point closer to the LOW side than the OD side, thereby enhancing durability of the belt of the CVT. Furthermore, since the vehicle speed does not exceed the regulatory vehicle speed and therefore the execution of fuel-cut that causes the abrupt decrease in the input torque can be avoided, the drivability does not deteriorate.

In the apparatus according to claim 2, the correction coefficient calculating means calculates the correction coefficient such that it gradually decreases after the running speed reaches a prescribed speed before the regulatory vehicle speed. With this, it becomes possible to reliably calculate the corrected desired output that is obtained by being corrected with the correction coefficient so that the vehicle running speed reaches the regulatory vehicle speed eventually when the accelerator opening reaches the fully-opened position.

In the apparatus according to claim 3, the correction coefficient calculating means calculates the correction coefficient such that it sharply decreases after the running speed exceeds the regulatory vehicle speed. With this, even when the running speed is increased towards the regulatory vehicle speed at a time of going downhill or for other reasons, since the corrected desired output is calculated so that the desired output is sharply decreased, it becomes possible to prevent the running speed from exceeding the regulatory vehicle speed. Therefore, the abrupt decrease in the output of the prime mover can be avoided.

DESCRIPTION OF EMBODIMENT

An embodiment for carrying out a vehicle control apparatus according to the present invention will now be explained with reference to the attached drawings.

Embodiment

Figure 1:
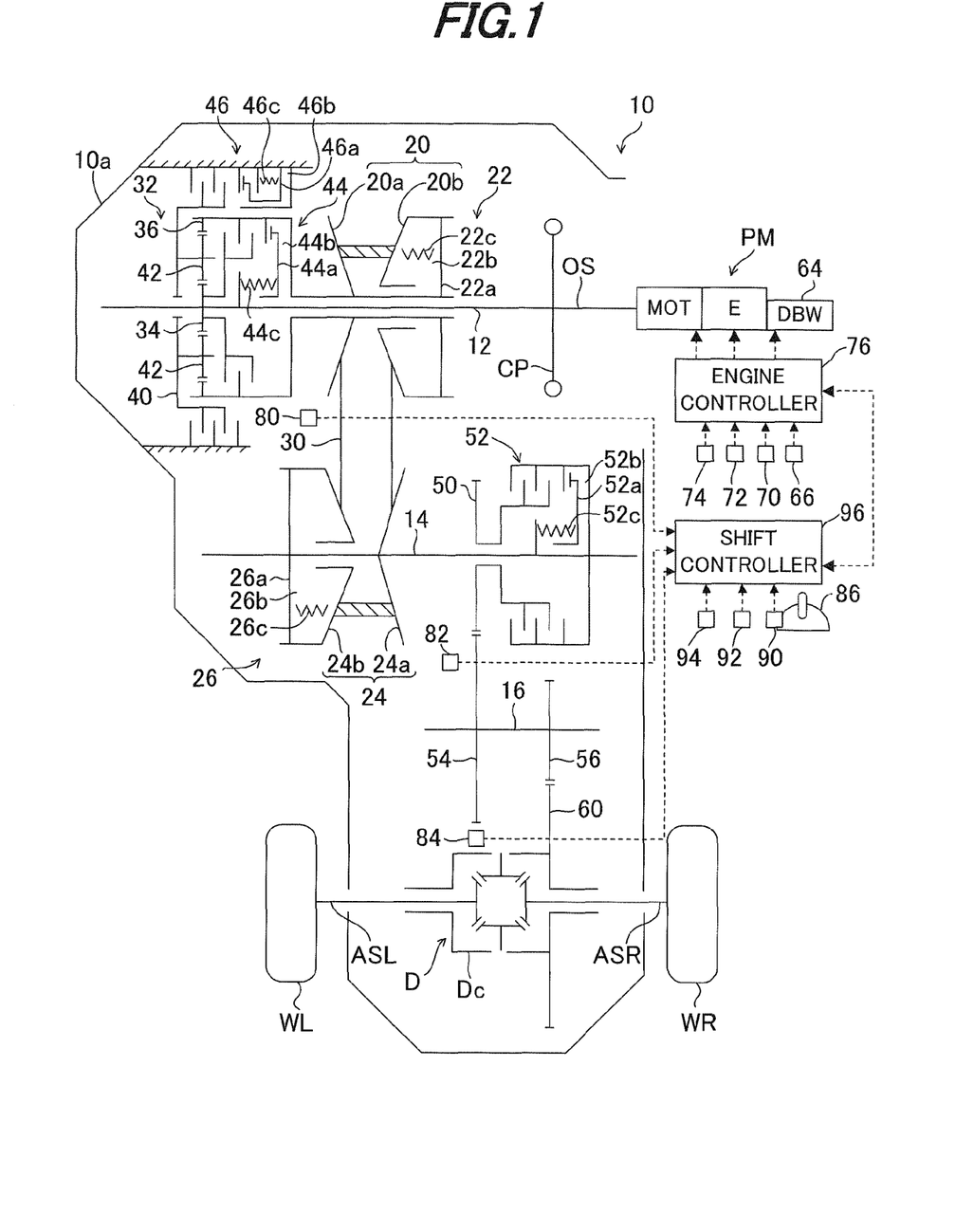
FIG. 1 is an overall view schematically showing a vehicle control apparatus according to this invention.

FIG. 1 is an overall view schematically showing a vehicle control apparatus according to this invention.

In FIG. 1, symbol 10 indicates a belt type Continuous Variable Transmission (CVT; hereinafter called the "CVT"). The CVT 10 is mounted on a vehicle (not shown) to change an output of a prime mover PM in speed and transmit it to right and left driven wheels (front wheels) WR, WL through a differential mechanism D.

The prime mover PM comprises an internal combustion engine (hereinafter called the "engine") E and an electric motor MOT. The motor MOT is coaxially connected to an output shaft (crankshaft) of the engine E and functions as a motor for rotating the engine E and a generator for regenerating power by being rotated by the engine E.

The CVT 10 has an input shaft 12, output shaft 14 and intermediate shaft 16 that are arranged in parallel and housed in a case 10a of the CVT 10 together with the differential mechanism D. The input shaft 12 is connected to an output shaft OS of the prime mover PM through a coupling mechanism CP.

The input shaft 12 is disposed with a drive pulley 20. The drive pulley 20 has a fixed drive pulley-half 20a installed on the input shaft 12 to be not rotatable relative thereto and immovable in the longitudinal direction of the shaft, and a movable drive pulley-half 20b installed to be not rotatable relative to the fixed drive pulley-half 20a but movable in the longitudinal direction of the shaft.

A drive pulley width setting mechanism 22 is installed beside the movable drive pulley-half 20b to set a pulley width of the drive pulley 20 in accordance with pressure of supplied operating oil.

The drive pulley width setting mechanism 22 has a cylinder wall 22a installed beside the movable drive pulley-half 20b, a cylinder chamber 22b formed between the cylinder wall 22a and the movable drive pulley-half 20b, and a return spring 22c installed in the cylinder chamber 22b to urge the movable drive pulley-half 20b toward the fixed drive pulley-half 20a.

When the pressure of the operating oil (hydraulic pressure) in the cylinder chamber 22b is increased, the movable drive pulley-half 20b is displaced toward the fixed drive pulley-half 20a so that the pulley width of the drive pulley 20 becomes narrower, while when the pressure of the operating oil is decreased, the movable drive pulley-half 20b is displaced away from the fixed drive pulley-half 20a so that the pulley width becomes wider.

The output shaft 14 is disposed with a driven pulley 24.

The driven pulley 24 has a fixed driven pulley-half 24a installed on the output shaft 14 to be not rotatable relative thereto and immovable in the longitudinal direction of the shaft, and a movable driven pulley-half 24b installed to be not rotatable relative to the fixed driven pulley-half 24a but movable in the longitudinal direction of the output shaft 14.

A driven pulley width setting mechanism 26 is installed beside the movable driven pulley-half 24b to set a pulley width of the driven pulley 24 in accordance with pressure of supplied operating oil.

The driven pulley width setting mechanism 26 has a cylinder wall 26a installed beside the movable driven pulley-half 24b, a cylinder chamber 26b formed between the cylinder wall 26a and the movable driven pulley-half 24b, and a return spring 26c installed in the cylinder chamber 26b to urge the movable driven pulley-half 24b toward the fixed driven pulley-half 24a.

When the pressure of the operating oil in the cylinder chamber 26b is increased, the movable driven pulley-half 24b is displaced toward the fixed driven pulley-half 24a so that the pulley width of the driven pulley 24 becomes narrower, while when the pressure of the operating oil is decreased, the movable driven pulley-half 24b is displaced away from the fixed driven pulley-half 24a so that the pulley width becomes wider.

A metal V-belt 30 is wound around the drive pulley 20 and driven pulley 24. The V-belt 30 has a number of elements that are connected through ring-shape members (not shown). V-shape surfaces formed on the elements contact pulley surfaces of the drive pulley 20 and those of the driven pulley 24, so that, as being firmly pressed from both sides, the V-belt 30 transmits power of the engine E from the drive pulley 20 to the driven pulley 24.

A planetary gear mechanism 32 is provided on the input shaft 12. The planetary gear mechanism 32 has a sun gear 34 spline-fitted to the input shaft 12 to be rotated integrally therewith, a ring gear 36 formed integrally with the fixed drive pulley-half 20a, a planetary carrier 40 installed to be rotatable relative to the input shaft 12, and a plurality of planetary gears 42 rotatably supported by the planetary carrier 40.

Each of the planetary gears 42 is always in mesh with both of the sun gear 34 and ring gear 36. An FWD (forward) clutch 44 is installed between the sun gear 34 and ring gear 36 and a RVS (reverse) brake clutch 46 is installed between the planetary carrier 40 and case 10a.

In the FWD clutch 44, upon the supply of the operating oil to a cylinder chamber 44b, a clutch piston 44a is displaced leftward (in FIG. 1) against spring force of a return spring 44c, so that a friction plate on the sun gear 34 side is engaged with a friction plate on the ring gear 36 side to couple the sun gear 34 to the ring gear 36, i.e., the FWD clutch 44 is engaged (brought to the in-gear position), thereby enabling the vehicle to move forward.

In the RVS brake clutch 46, upon the supply of the operating oil to a cylinder chamber 46b, a brake piston 46a is displaced leftward (in FIG. 1) against spring force of a return spring 46c, so that a friction plate on the case 10a side is engaged with a friction plate on the planetary carrier 40 side to couple the case 10a to the planetary carrier 40, i.e., the RVS brake clutch 46 is engaged (brought to the in-gear position), thereby enabling the vehicle to move backward (in reverse).

When the FWD clutch 44 is in engagement, the ring gear 36 is unable to rotate relative to the sun gear 34 and when the RVS brake clutch 46 is in engagement, the planetary carrier 40 is unable to rotate relative to the case 10a. Therefore, when the FWD clutch 44 is engaged with the input shaft 12 rotating, the ring gear 36 is rotated integrally with the sun gear 34 and the drive pulley 20 is rotated in the same direction as the input shaft 12. At that time, each of the planetary gears 42 is rotated around the input shaft 12 integrally with the sun gear 34 and ring gear 36 without rotating about itself.

On the other hand, when the RVS brake clutch 46 is engaged with the input shaft 12 rotating, the sun gear 34 is rotated integrally with the input shaft 12, while the planetary gears 42 are self-rotated to rotate the ring gear 36 in the opposite direction from the sun gear 34. Accordingly, the drive pulley 20 is rotated in the opposite direction from the input shaft 12.

When both the FWD clutch 44 and RVS brake clutch 46 are not in engagement, only the input shaft 12 and sun gear 34 are rotated and the rotation of the engine E is not transmitted to the drive pulley 20.

The output shaft 14 is provided with an intermediate shaft drive gear 50 and a starting clutch 52. In the starting clutch 52, upon the supply of the operating oil to a cylinder chamber 52b, a clutch piston 52a is displaced against spring force of a return spring 52c, so that a friction plate on the output shaft 14 side is engaged with a friction plate on the intermediate shaft drive gear 50 side to couple the output shaft 14 to the intermediate shaft drive gear 50.

When the starting clutch 52 is in engagement, the intermediate shaft drive gear 50 is unable to rotate relative to the output shaft 14. Therefore, when the starting clutch 52 is engaged with the output shaft 14 rotating, the intermediate shaft drive gear 50 is rotated integrally with the output shaft 14.

The intermediate shaft 16 is provided with an intermediate shaft driven gear 54 and differential drive gear 56. The gears 54, 56 are fixed on the intermediate shaft 16 and the intermediate shaft driven gear 54 is always in mesh with the intermediate shaft drive gear 50.

The differential drive gear 56 is always in mesh with a differential driven gear 60 fixed at a differential case Dc of the differential mechanism D.

The differential mechanism D is fastened with right and left axle shafts ASR, ASL and the ends of the shafts ASR, ASL are attached with right and left driven wheels WR, WL, respectively. The differential driven gear 60 is always in mesh with the differential drive gear 56 so that the entire differential case Dc is rotated about the axle shafts ASR, ASL with the rotation of the intermediate shaft 16.

Under a condition where the pulley clamping pressures that can prevent the V-belt 30 from slipping are given to the cylinder chamber 22b of the drive pulley 20 and the cylinder chamber 26b of the driven pulley 24 by controlling the pressures of the operating oils to be supplied to the cylinder chambers 22b, 26b of the pulleys, when the rotation of the engine E is inputted to the input shaft 12, the inputted rotation is transmitted from the input shaft 12, through the drive pulley 20, V-belt 30 and driven pulley 24 then to the output shaft 14.

At this time, the pulley clamping pressures of the drive pulley 20 and driven pulley 24 are increased and decreased to change the pulley widths to vary the winding radiuses of the V-belt 30 with respect to the pulleys 20, 24, whereby a continuous or stepless gear ratio can be achieved as desired in accordance with a ratio of the winding radiuses (pulley ratio).

When the starting clutch 52 is engaged under the above-mentioned condition where the rotation of the engine E is transmitted from the input shaft 12 to the output shaft 14, the intermediate shaft drive gear 50 is connected to the output shaft 14 to be rotated integrally therewith, so that the rotation transmitted to the output shaft 14 is further transmitted via the intermediate shaft drive gear 50 to the intermediate shaft driven gear 54, thereby rotating the intermediate shaft 16. The rotation of the intermediate shaft 16 is transmitted via the differential mechanism D and axle shafts ASL, ASR to the right and left driven wheels WR, WL to drive them.

On the other hand, when the starting clutch 52 is not in engagement, the intermediate shaft drive gear 50 is not connected to the output shaft 14 and the rotating power of the output shaft 14 is not transmitted to the intermediate shaft drive gear 50 accordingly, so that the driven wheels WR, WL are not driven.

The pulley widths of the drive pulley 20, etc., the engagement and disengagement (in-gear and out-gear) of the FWD clutch 44 and RVS brake clutch 46, and other operations are controlled by regulating the pressure of the operating oil (hydraulic pressure) to be supplied to the cylinder chambers 22b, 26b, 44b, 46b, 52b in a hydraulic circuit, although the explanation thereof is omitted.

Returning to the explanation of FIG. 1, the engine E is provided with a DBW mechanism 64. To be specific, a throttle valve (not shown) of the engine E has no mechanical connection with an accelerator pedal (not shown) installed at a floor of the operator's seat of the vehicle. The throttle valve is opened and closed by an actuator (e.g., an electric motor; not shown) of the DBW mechanism 64.

A crank angle sensor 66 is installed near a cam shaft (not shown) of the engine E or thereabout and produces an output or signal indicative of an engine speed NE at every predetermined crank angle position of the piston.

In the intake system, a manifold absolute pressure sensor 70 installed downstream of the throttle valve produces an output or signal proportional to manifold absolute pressure (engine load) PBA, an intake air temperature sensor 72 installed upstream of the throttle valve produces an output or signal indicative of a temperature of intake air, and a coolant temperature sensor 74 installed near a coolant passage (not shown) produces an output or signal indicative of an engine coolant temperature TW.

The outputs of the crank angle sensor 66 and other sensors are sent to an engine controller 76. The engine controller 76 includes a microcomputer and based on the sensor outputs, controls the output of the engine E, etc., through the DBW mechanism 64.

In the CVT 10, an NDR sensor 80 is installed at an appropriate position near the drive pulley 20 to produce a pulse signal corresponding to a rotational speed of the drive pulley 20, i.e., an input rotational speed NDR of the CVT, while an NDN sensor 82 is installed at an appropriate position near the driven pulley 24 to produce a pulse signal corresponding to a rotational speed of the driven pulley 24, i.e., an output rotational speed NDN of the CVT (which corresponds to an input rotational speed of the starting clutch 52).

A wheel speed sensor 84 is installed near the intermediate shaft driven gear 54 of the intermediate shaft 16 and produces a pulse signal indicative of a vehicle speed (running speed of the vehicle) V using the rotational speed of the intermediate shaft driven gear 54.

A select lever position sensor 90 is installed near a select lever 86 and produces a signal corresponding to a position selected by the operator from positions of P, R, N, D and S. An oil temperature sensor 92 is installed in a reservoir of the hydraulic circuit to produce an output or signal representing a temperature of the operating oil (oil temperature).

Accelerator position sensor 94 installed near the accelerator pedal at the operator's seat of the vehicle produces a signal proportional to an accelerator position or opening AP corresponding to an amount of operator's manipulation of the accelerator pedal (which will be later shown with 0/8 to 8/8).

The outputs of the above sensors are sent to a shift controller 96 (the output of the accelerator position sensor 94 is sent also to the engine controller 76).

The shift controller 96 also includes a microcomputer and based on the sensor outputs, energizes and de-energizes electromagnetic solenoid valves of the hydraulic circuit to regulate the pressure of the operating oil (hydraulic pressure) to be supplied to the cylinder chamber 22b, etc., for controlling the pulley widths and the engagement and disengagement of the clutches 44, 46, 52, while setting a desired engine speed (desired speed) NED and controlling the output of the engine E (prime mover). The shift controller 96 and engine controller 76 are interconnected by a signal line to be communicatable with each other.

Figure 2:
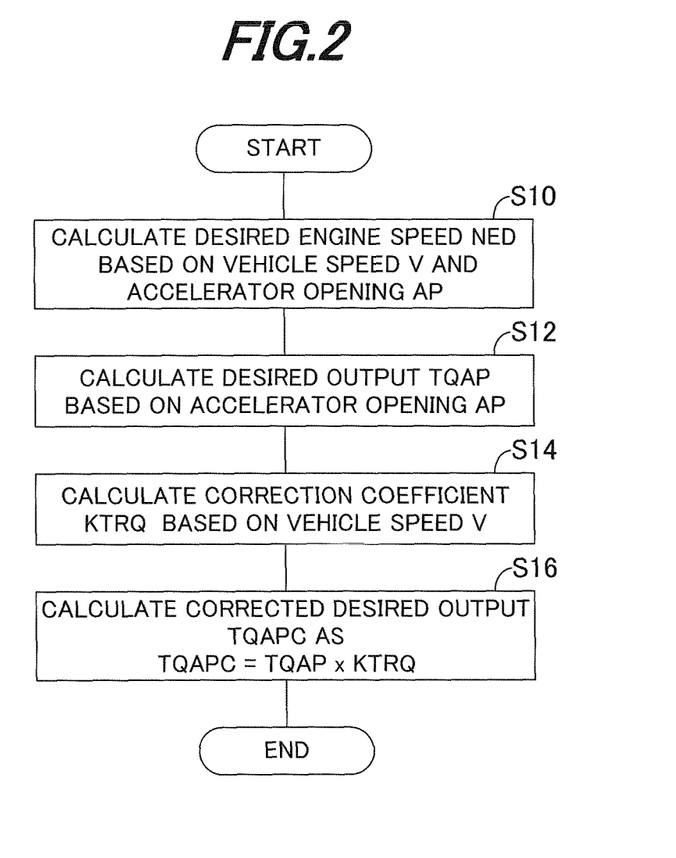
FIG. 2 is a flowchart showing an operation of the apparatus shown in FIG. 1.

FIG. 2 is a flowchart showing the operation of the shift controller 96. The illustrated program is executed at predetermined intervals, e.g., 10 milliseconds.

The program begins at S10, in which a desired speed NED of the prime mover PM inputted to the CVT 10, more specifically of the engine E (since the engine E and the motor MOT are directly connected with each other) is based on the detected vehicle speed V and accelerator opening AP.

Figure 3:
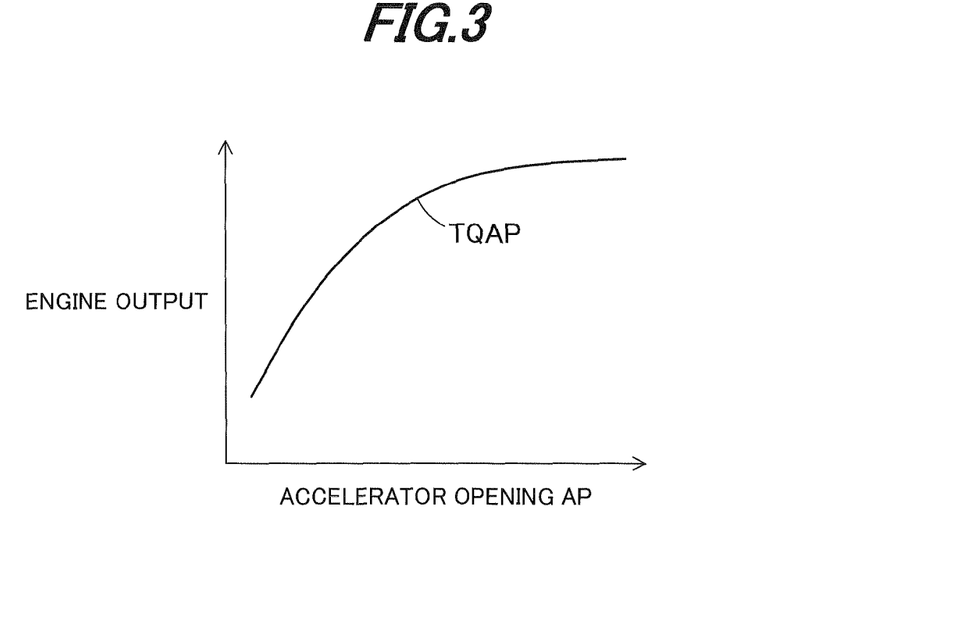
FIG. 3 is an explanatory view showing the characteristics of a desired output used in a process of the FIG. 2 flowchart.

Next the program proceeds to S12, in which based on the accelerator opening AP, a desired output TQAP of the prime mover PM, i.e., of the engine E is calculated. The desired output is calculated by retrieving the characteristics shown in FIG. 3 set in advance using the accelerator opening AP.

Figure 4:
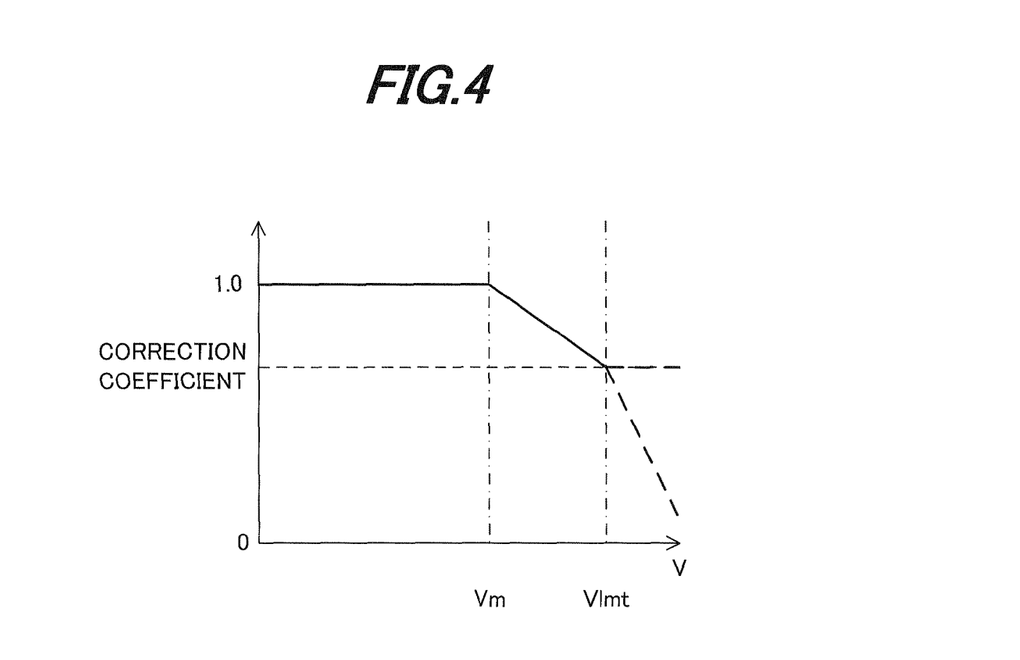
FIG. 4 is an explanatory view showing the characteristics of a correction coefficient used in a process of the FIG. 2 flowchart.

Next the program proceeds to S14, in which a correction coefficient KTRQ is calculated based on the vehicle speed V, more exactly, the correction coefficient KTRQ is calculated by retrieving the characteristics shown in FIG. 4 set in advance using the vehicle speed V.

Figure 5:
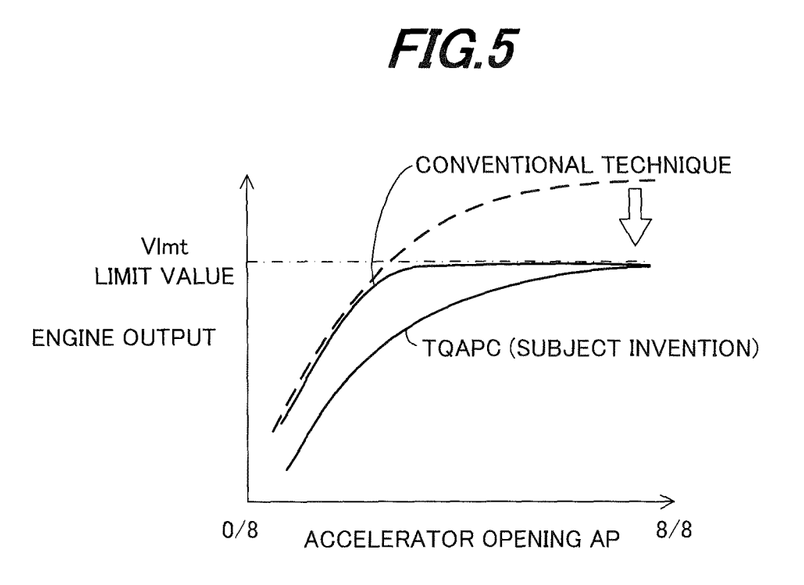
FIG. 5 is an explanatory view showing a corrected desired output calculated in a process of the FIG. 2 flowchart.

Next the program proceeds to S16, in which the calculated desired output TQAP is multiplied by the correction coefficient KTRQ to correct the desired output TQAP, i.e., to obtain a corrected desired output TQAPC, so that the vehicle speed V reaches the regulatory vehicle speed Vlmt (180 km/h) when the accelerator opening AP reaches the fully-opened position, as shown in FIG. 5.

Specifically, as shown in FIG. 4, the correction coefficient KTRQ is configured to start to be decreased at a point associated with a prescribed speed Vm that is lower than the regulatory vehicle speed Vlmt gradually from 1.0 to 0. As a result, the corrected desired output TQAPC calculated by multiplying the correction coefficient enables the vehicle speed V to reach the regulatory vehicle speed Vlmt (180 km/h) eventually when the accelerator opening AP reaches the fully-opened position, as shown in FIG. 5.

The correction coefficient KTRQ is sharply decreased to 0 after the vehicle speed exceeds the regulatory vehicle speed Vlmt, as indicated by a dashed line. Consequently, when the vehicle speed V is about to exceed the regulatory vehicle speed Vlmt at a time of going downhill or for other reasons, since the corrected desired output TQAPC is calculated so that the desired output TQAP is sharply decreased, it becomes possible to prevent the vehicle speed V from exceeding the regulatory vehicle speed Vlmt. Therefore, the execution of fuel-cut that causes the abrupt decrease in the engine E output can be avoided.

As stated above, this embodiment is configured to have an apparatus for controlling a vehicle having a belt type CVT (Continuous Variable Transmission) 10 that changes power of a prime mover PM (engine E and electric motor MOT) mounted on the vehicle in speed, comprising desired speed setting means (shift controller 96, S10) for setting a desired speed NED of the prime mover PM, i.e., of the engine E, to be inputted to the CVT (Continuous Variable Transmission) 10 based on a running speed (vehicle speed) V of the vehicle and an accelerator opening AP; desired output calculating means (shift controller 96, S12) for calculating a desired output TQAP of the prime mover PM, i.e., of the engine E, based on the accelerator opening AP; correction coefficient calculating means (shift controller 96, S14) for calculating a correction coefficient KTRQ based on the running speed (vehicle speed) V of the vehicle; and corrected desired output calculating means (shift controller 96, S16) for calculating a corrected desired output TQAPC by correcting the desired output with the correction coefficient such that the running speed (vehicle speed) V of the vehicle reaches a regulatory vehicle speed Vlmt when the accelerator opening AP reaches a fully-opened position.

Further, the correction coefficient calculating means calculates the correction coefficient KTRQ to gradually decrease after the running speed V reaches a prescribed speed Vm of lower than the regulatory vehicle speed Vlmt.

Further, the correction coefficient calculating means calculates the correction coefficient KTRQ to sharply decrease after the running speed V exceeds the regulatory vehicle speed Vlmt.

Figure 6:
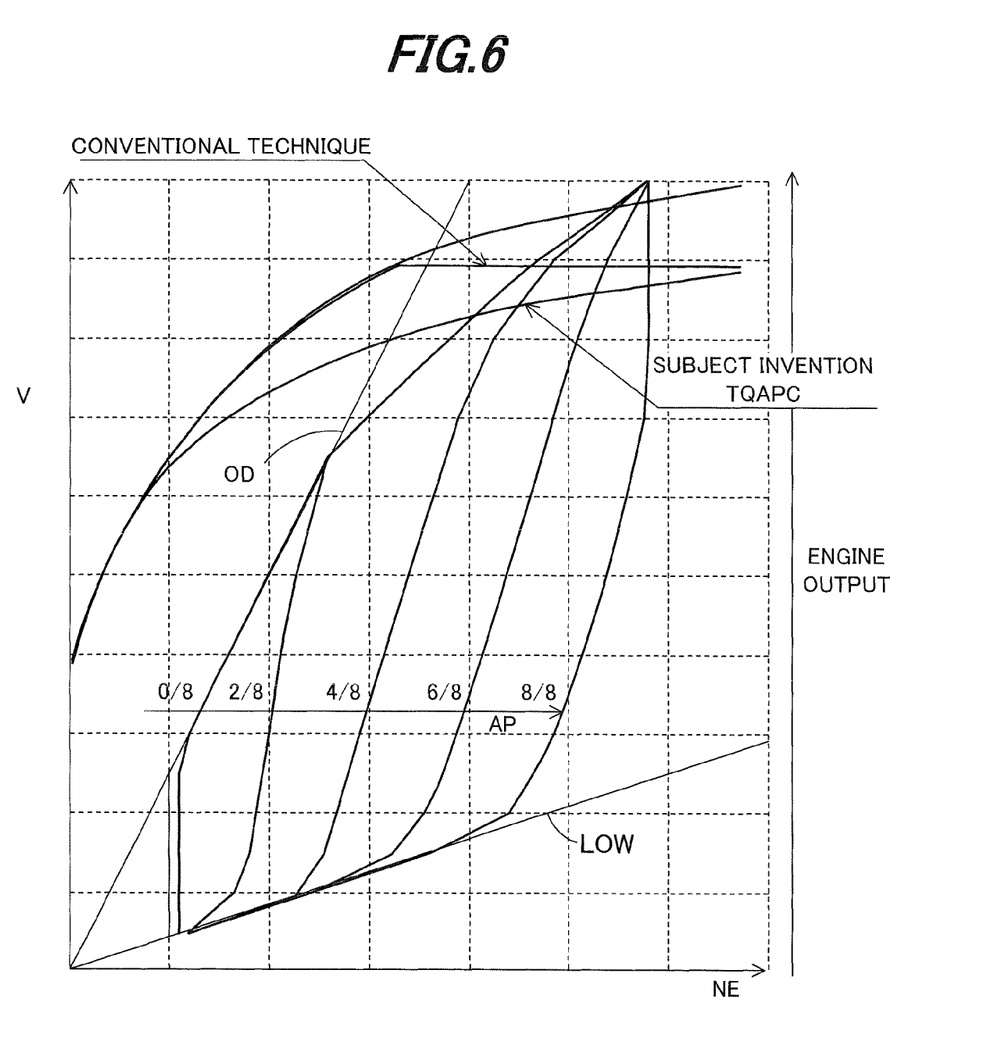
FIG. 6 is an explanatory view for explaining processes of the FIG. 2 flowchart.

FIG. 6 is an explanatory view for explaining the engine output and transmission characteristics of the CVT 10 according to the embodiment.

As shown in FIG. 6 (and FIG. 5), conventionally, even when the accelerator opening AP reaches only about a half of the fully-opening position (8/8), the vehicle speed reaches the regulatory vehicle speed Vlmt. Since the vehicle speed does not change when the accelerator pedal is pressed down more, the operator can not have a good acceleration feel. Further, since the vehicle is driven with a small accelerator opening AP, a ratio of the CVT 10 tends to be controlled to an OD (overdrive) side, disadvantageously.

On the other hand, the embodiment is configured to calculate the corrected desired output so that the vehicle speed V reaches the regulatory vehicle speed Vlmt eventually when the accelerator opening AP reaches the fully-opened position (8/8), i.e., to vary the characteristics of the accelerator opening AP in accordance with the vehicle speed V in the vicinity of the regulatory vehicle speed. Therefore, it becomes possible to achieve the characteristics that enable the vehicle speed to reach the regulatory vehicle speed eventually when the accelerator pedal is fully pressed down, thereby giving a good acceleration feel to the operator.

Further, since the characteristics are configured to enable the vehicle speed to reach the regulatory vehicle speed Vlmt eventually when the accelerator pedal is fully pressed down, the vehicle is driven with a relatively large accelerator opening AP. Consequently, a ratio of the CVT 10 tends to be controlled at a point closer to the LOW side than the OD side as shown in FIG. 6, thereby enhancing durability of the belt 30 of the CVT 10. Furthermore, since the vehicle speed does not exceed the regulatory vehicle speed Vlmt and therefore the execution of fuel-cut that causes the abrupt decrease in the input torque can be avoided, the drivability does not deteriorate.

Further, the correction coefficient calculating means calculates the correction coefficient KTRQ such that it gradually decreases after the running speed (vehicle speed) V reaches a prescribed speed Vm before the regulatory vehicle speed Vlmt (in other words, lower than the regulatory vehicle speed Vlmt), so that the coefficient KTRQ starts to be decreased at a point associated with the prescribed speed Vm gradually from 1.0 to 0. With this, it becomes possible to reliably calculate the corrected desired output TQAPC that is obtained by being corrected with the correction coefficient KTRQ so that the vehicle speed V reaches the regulatory vehicle speed Vlmt eventually when the accelerator opening AP reaches the fully-opened position.

Further, the correction coefficient calculating means calculates the correction coefficient KTRQ such that it sharply decreases (to 0) after the vehicle speed (running speed) V exceeds the regulatory vehicle speed Vlmt. With this, even when the vehicle speed V is about to exceed the regulatory vehicle speed Vlmt at a time of going downhill or for other reasons, since the corrected desired output TQAPC is calculated so that the desired output TQAP is sharply decreased, it becomes possible to prevent the vehicle speed V from exceeding the regulatory vehicle speed Vlmt. Therefore, the abrupt decrease in the output of the prime mover PM, e.g., of the engine E can be avoided.

It should be noted that, in the foregoing, although the prime mover PM comprises the engine E and motor MOT, it may be either one of the engine E and motor MOT.

INDUSTRIAL APPLICABILITY

According to this invention, a vehicle control apparatus is configured to set a desired speed of a prime mover to be inputted to a CVT based on a running speed of a vehicle and an accelerator opening, calculate a desired output of the prime mover based on the accelerator opening, calculate a correction coefficient based on the running speed of the vehicle, and calculate a corrected desired output by correcting the desired output with the correction coefficient such that the running speed of the vehicle reaches a regulatory vehicle speed when the accelerator opening reaches a fully-opened position, i.e., to vary the characteristics of the accelerator opening in accordance with the vehicle speed in the vicinity of the regulatory vehicle speed. Therefore, it becomes possible to achieve the characteristics that enable the vehicle speed to reach the regulatory vehicle speed eventually when the accelerator pedal is fully pressed down, thereby giving a good acceleration feel to the operator, enhancing durability of the belt of the CVT, and avoiding deterioration of the drivability.

DESCRIPTION OF SYMBOLS

10 CVT (Continuous Variable Transmission), 12 Input shaft, 14 Output shaft, 16 Intermediate shaft, 20 Drive pulley, 22 Drive pulley width setting mechanism, 22b Cylinder chamber, 24 Driven pulley, 26 Driven pulley width setting mechanism, 26b Cylinder chamber, 30 V-belt, 44 FWD clutch, 44b Cylinder chamber, 46 RVS brake clutch, 52 Starting clutch, 52b Cylinder chamber, 64 DBW mechanism, 66 Crank angle sensor, 70 Manifold absolute pressure sensor, 72 Intake air temperature sensor, 76 Engine controller, 80 NDR sensor, 82 NDN sensor, 84 Vehicle speed sensor, 92 Oil temperature sensor, 94 Accelerator position sensor, 96 Shift controller, PM Prime mover, E Internal combustion engine, MOT Electric motor, WL, WR Driven wheels

The invention claimed is:

1. An apparatus for controlling a vehicle having a belt type CVT that changes output of a prime mover mounted on the vehicle in speed, comprising:
    a desired speed setter adapted to set a desired speed of the CVT in terms of a speed of the prime mover to be inputted to the CVT based on a running speed of the vehicle and an accelerator opening;
    a desired output calculator adapted to calculate a desired output of the prime mover based on the accelerator opening;
    a correction coefficient calculator adapted to calculate a correction coefficient based on the running speed of the vehicle; and
    a corrected desired output calculator adapted to calculate a corrected desired output by correcting the desired output with the correction coefficient such that the running speed of the vehicle reaches a regulatory vehicle speed when the accelerator opening reaches a fully-opened position.

2. The apparatus according to claim 1, wherein the correction coefficient calculator calculates the correction coefficient such that it gradually decreases after the running speed reaches a prescribed speed of lower than the regulatory vehicle speed.

3. The apparatus according to claim 1, wherein the correction coefficient calculator calculates the correction coefficient such that it sharply decreases after the running speed exceeds the regulatory vehicle speed.

4. The apparatus according to claim 2, wherein the correction coefficient calculator calculates the correction coefficient such that it sharply decreases after the running speed exceeds the regulatory vehicle speed.

5. An apparatus for controlling a vehicle having a belt type CVT that changes power of a prime mover mounted on the vehicle in speed, comprising:
    desired speed setting means for setting a desired speed of the CVT in terms of a speed of the prime mover to be inputted to the CVT based on a running speed of the vehicle and an accelerator opening;
    desired output calculating means for calculating a desired output of the prime mover based on the accelerator opening;
    correction coefficient calculating means for calculating a correction coefficient based on the running speed of the vehicle; and
    corrected desired output calculating means for calculating a corrected desired output by correcting the desired output with the correction coefficient such that the running speed of the vehicle reaches a regulatory vehicle speed when the accelerator opening reaches a fully-opened position.

6. The apparatus according to claim 5, wherein the correction coefficient calculating means calculates the correction coefficient such that it gradually decreases after the running speed reaches a prescribed speed of lower than the regulatory vehicle speed.

7. The apparatus according to claim 5, wherein the correction coefficient calculating means calculates the correction coefficient such that it sharply decreases after the running speed exceeds the regulatory vehicle speed.

8. The apparatus according to claim 6, wherein the correction coefficient calculating means calculates the correction coefficient such that it sharply decreases after the running speed exceeds the regulatory vehicle speed.

9. A method for controlling a vehicle having a belt type CVT that changes power of a prime mover mounted on the vehicle in speed, comprising the steps of:

setting a desired speed of the CVT in terms of a speed of the prime mover to be inputted to the CVT based on a running speed of the vehicle and an accelerator opening;

calculating a desired output of the prime mover based on the accelerator opening;

calculating a correction coefficient based on the running speed of the vehicle; and calculating a corrected desired output by correcting the desired output with the correction coefficient such that the running speed of the vehicle reaches a regulatory vehicle speed when the accelerator opening reaches a fully-opened position.

10. The method according to claim 9, wherein the step of calculating the correction coefficient calculates the correction coefficient such that it gradually decreases after the running speed reaches a prescribed speed of lower than the regulatory vehicle speed.

11. The method according to claim 9, wherein the step of calculating the correction coefficient calculates the correction coefficient such that it sharply decreases after the running speed exceeds the regulatory vehicle speed.

12. The method according to claim 10, wherein the step of calculating the correction coefficient calculates the correction coefficient such that it sharply decreases after the running speed exceeds the regulatory vehicle speed.

* * * * *